(12) United States Patent
Li et al.

(10) Patent No.: US 12,007,529 B2
(45) Date of Patent: Jun. 11, 2024

(54) MULTILAYER METALENS

(71) Applicant: KING ABDULLAH UNIVERSITY OF SCIENCE AND TECHNOLOGY, Thuwal (SA)

(72) Inventors: Xiaohang Li, Thuwal (SA); Ronghui Lin, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 293 days.

(21) Appl. No.: 17/605,382

(22) PCT Filed: Apr. 20, 2020

(86) PCT No.: PCT/IB2020/053731
§ 371 (c)(1),
(2) Date: Oct. 21, 2021

(87) PCT Pub. No.: WO2020/225633
PCT Pub. Date: Nov. 12, 2020

(65) Prior Publication Data
US 2022/0229207 A1    Jul. 21, 2022

Related U.S. Application Data

(60) Provisional application No. 62/843,046, filed on May 3, 2019.

(51) Int. Cl.
*G02B 1/00* (2006.01)
*G02B 27/42* (2006.01)
*H01Q 15/00* (2006.01)

(52) U.S. Cl.
CPC .......... *G02B 1/002* (2013.01); *G02B 27/4272* (2013.01); *H01Q 15/0086* (2013.01)

(58) Field of Classification Search
CPC .......... H01Q 15/0086; H01Q 15/02–12; H01Q 15/0026; H01Q 19/06; H01Q 19/062; H01Q 19/065; G02B 1/002; G02B 5/1809
See application file for complete search history.

(56) References Cited

U.S. PATENT DOCUMENTS

2012/0112230 A1 * 5/2012 Jun ...................... H01Q 19/062
257/98
2014/0313090 A1 * 10/2014 Oh ......................... H01Q 19/09
343/753

(Continued)

FOREIGN PATENT DOCUMENTS

WO        2018204856 A1    11/2018

OTHER PUBLICATIONS

Avayu, O., et al., "Composite Functional Metasurfaces for Multispectral Achromatic Optics," Nature Communications, Apr. 5, 2017, vol. 8, No. 14992, pp. 1-7.

(Continued)

*Primary Examiner* — Dimary S Lopez Cruz
*Assistant Examiner* — Aladdin Abdulbaki
(74) *Attorney, Agent, or Firm* — PATENT PORTFOLIO BUILDERS PLLC

(57) ABSTRACT

A multilayer metalens includes a substrate having first, second, and third axes that are perpendicular to each other. A first layer of antennas is arranged, relative to the third axis, on the substrate. Each antenna of the first layer of antennas is rotated relative to the first and second axes based on a position of each antenna of the first layer of antennas along the first and second axes. A second layer of antennas is arranged, in the third axis, on the first layer of antennas. Each antenna of the second layer of antennas is rotated relative to the first and second axes based on a position of each antenna of the second layer of antennas along the first and second axes. Each antenna in the first and second layers (Continued)

of antennas has, in a plane parallel to a top of the substrate an elongated shape. Each antenna in the first layer of antennas has a different rotation relative to the first and second axes than an antenna in the second layer of antennas that is located, relative to the third axis, adjacent to the respective antenna in the first layer of antennas.

20 Claims, 8 Drawing Sheets

(56) References Cited

U.S. PATENT DOCUMENTS

| | | | |
|---|---|---|---|
| 2015/0229032 A1* | 8/2015 | Liu | H01Q 15/0026 343/766 |
| 2017/0082263 A1* | 3/2017 | Byrnes | H01Q 15/0086 |
| 2019/0257986 A1* | 8/2019 | Paniagua Dominguez | H01Q 15/02 |
| 2021/0028547 A1* | 1/2021 | Falk | H01Q 15/0086 |

OTHER PUBLICATIONS

Chen, J., et al., "A High-Efficiency Dual-Wavelength Achromatic Metalens Based on Pancharatnam-Berry Phase Manipulation," Optics Express, Dec. 24, 2018, vol. 26, No. 26, 9 pp.

Chen, Q., et al., "High Numerical Aperture Multifocal Metalens Based on Pancharatnam-Berry Phase Optical Elements," Applied Optics, Sep. 20, 2018, vol. 57, No. 27, pp. 7891-7894.

Hsiao, H.-H., et al., "Fundamentals and Applications of Metasurfaces," Small Methods, Mar. 24, 2017, vol. 1, 1600064 pp. 1-20, WILEY-VCH Verlag GmbH & Co. KGaA, Weinheim.

International Search Report in corresponding/related International Application No. PCT/IB2020/053731, date of mailing Jul. 20, 2020.

Khorasaninejad, M., et al., "Visible Wavelength Planar Metalenses Based on Titanium Dioxide," IEEE Journal of Selected Topics in Quantum Electronics, May/Jun. 2017, vol. 23, No. 3, 4700216, 16 pp., IEEE.

Tian, S., et al., "Dielectric Longitudinal Bifocal Metalens with Adjustable Intensity and High Focusing Efficiency," Optics Express, Jan. 8, 2019, vol. 27, No. 2, pp. 680-688.

Written Opinion of the International Searching Authority in corresponding/related International Application No. PCT/IB2020/053731, date of mailing Jul. 20, 2020.

Yang, Z., et al., "Generalized Hartmann-Shack Array of Dielectric Metalens Sub-Arrays for Polarimetric Beam Profiling," ARXIV. ORG, Cornell University Library, 201 Olin Library Cornell University, Ithaca, NY, 14853, Jul. 18, 2018, pp. 1-20.

Yang, Z., et al., "Generalized Hartmann-Shack Array of Dielectric Metalens Sub-Arrays for Polarimetric Beam Profiling," Nature Communications, Nov. 2, 2018, vol. 9, No. 4607, pp. 1-20.

Zheng, G., et al., "A Dual Field-of-View Zoom Metalens," Optics Letters, Nov. 2016, vol. 42, No. 7, 12 pp.

Zhou, Y., et al., "Multilayer Non-Interacting Dielectric Metasurfaces for Multiwavelength Metaoptics," Nano Letters, Nov. 5, 2018, pp. 1-26, ACS Publications.

* cited by examiner

MULTILAYER METALENS

CROSS-REFERENCE TO RELATED APPLICATIONS

This application is a U.S. National Stage Application of International Application No. PCT/IB2020/053731, which claims priority to U.S. Provisional Patent Application No. 62/843,046, filed on May 3, 2019, entitled "DIELECTRIC MULTILAYER METALENSES FOR MULTIFOCAL AND ACHROMATIC APPLICATIONS," the disclosures of which are incorporated herein by reference in their entirety.

BACKGROUND

Technical Field

Embodiments of the disclosed subject matter generally relate to a multilayer metalens that produces at least two focal lengths, which respectively form at least two focal points.

Discussion of the Background

For many years, research and development in the field of lenses were directed to forming the lenses with areas of varying thicknesses so that light waves passing through different portions of the lenses are refracted at different angles. The recent development of metalenses has opened a number of new avenues for research and development in the field of lenses. The most basic structure of a metalens consists of a single layer of optical antennas (also commonly referred to as antennas, nanofins, and phase elements) that are arranged in a specific pattern to achieve a specific modification of the light. The optical antennas are typically on the nanometer scale and are spaced apart from each other by less than the wavelength of the desired wavelength of light that is being manipulated by the metalens. Metalenses have been developed for a number of applications, including focusing lenses, axicons, optical orbital angular momentum generation, and holograms.

One technique for creating a metalens with more than one focal point is through the use of spatial multiplexing, which involves different portions of the metalens (and thus different sets of antennas of the metalens) being configured to produce the different focal points. Specifically, the surface area of the metalens is divided into several concentric rings, each ring corresponding to one focal spot. The main drawback of this technique is that only a portion of the metalens contributes to the formation of each focal point, which reduces focusing performance and makes it difficult to control the relative focal intensity of the different focal points.

Thus, there is a need for a metalens in which substantially the entire metalens is employed for forming at least two focal points and that allows greater control over the relative focal intensity of the at least two focal points.

SUMMARY

According to an embodiment, there is a multilayer metalens that includes a substrate having first, second, and third axes that are perpendicular to each other. A first layer of antennas is arranged, relative to the third axis, on the substrate. Each antenna of the first layer of antennas is rotated relative to the first and second axes based on a position of each antenna of the first layer of antennas along the first and second axes. A second layer of antennas is arranged, in the third axis, on the first layer of antennas. Each antenna of the second layer of antennas is rotated relative to the first and second axes based on a position of each antenna of the second layer of antennas along the first and second axes. Each antenna in the first and second layers of antennas has, in a plane parallel to a top of the substrate an elongated shape. Each antenna in the first layer of antennas has a different rotation relative to the first and second axes than an antenna in the second layer of antennas that is located, relative to the third axis, adjacent to the respective antenna in the first layer of antennas.

According to another embodiment, there is method for forming a multilayer metalens. A substrate having first, second, and third axes that are perpendicular to each other is provided. A first layer of antennas is arranged, relative to the third axis, on the substrate. Each antenna of the first layer of antennas is rotated relative to the first and second axes based on a position of each antenna of the first layer of antennas along the first and second axes. A second layer of antennas is arranged, relative to the third axis, on the first layer of antennas. Each antenna of the second layer of antennas is rotated relative to first and second axes based on a position of each antenna of the second layer of antennas along the first and second axes. Each antenna in the first and second layers of antennas has, in a plane parallel to a top of the substrate, an elongated shape. Each antenna in the first layer of antennas has a different rotation relative to the first and second axes than an antenna in the second layer of antennas that is located, relative to the third axis, adjacent to the respective antenna in the first layer of antennas.

According to a further embodiment, there is a method of focusing light at two different focal points. Light is passed through a substrate having first, second, and third axes that are perpendicular to each other. The light is passed through first and second layers of antennas. The light exiting the second layer of antennas is focused at the two different focal points. Each antenna of the first and second layers of antennas has a position-dependent rotation angle based on the two different focal points. Each antenna in the first layer of antennas has a different rotation angle than an antenna in the second layer of antennas that is located, relative to the third axis, adjacent to the respective antenna in the first layer of antennas. Each antenna of the first and second layers of antennas has an elongated shape in a plane defined by the first and second axes.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of metalenses.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
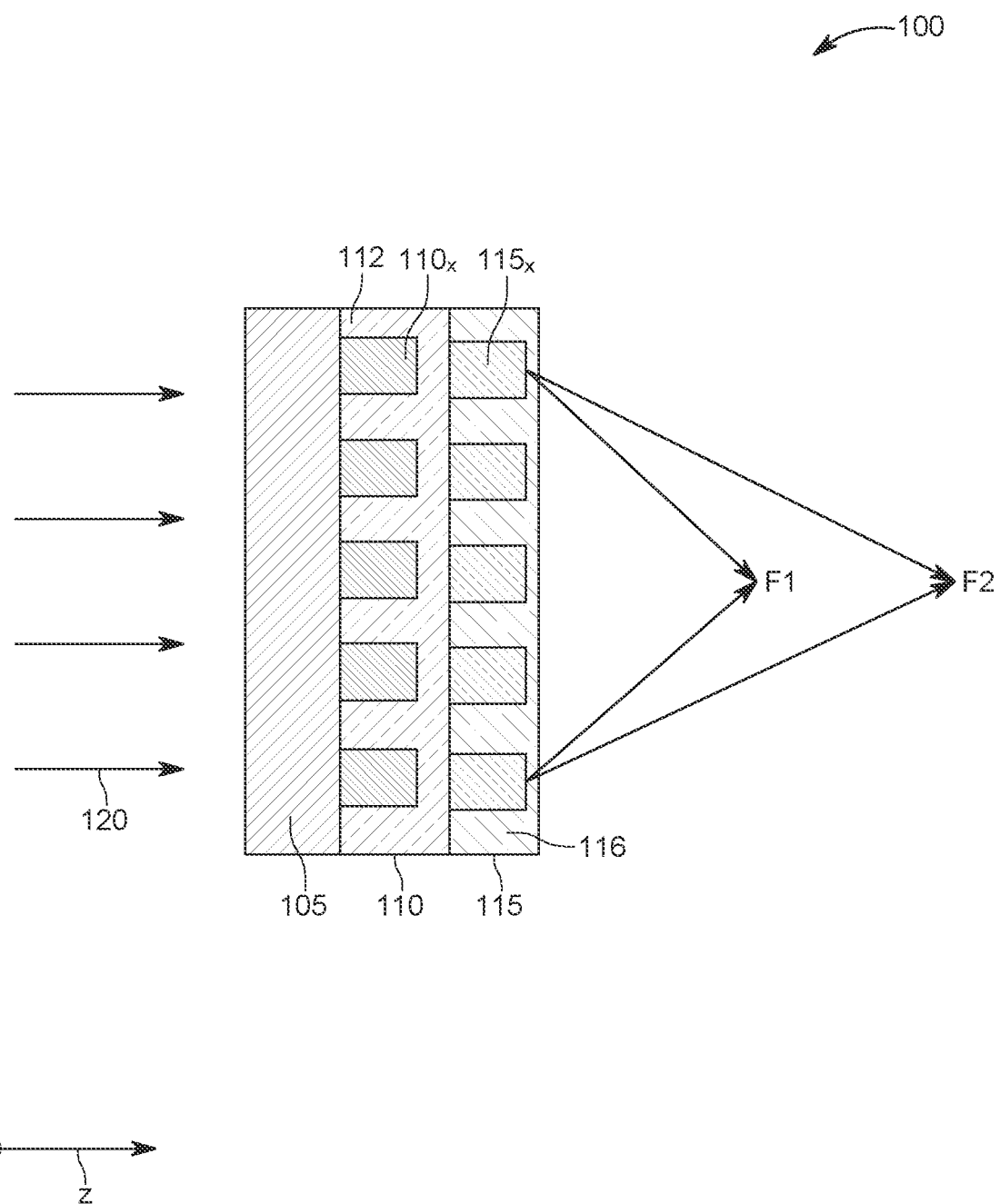
FIG. 1 is a schematic diagram of a multilayer metalens according to embodiments.
Figure 2:
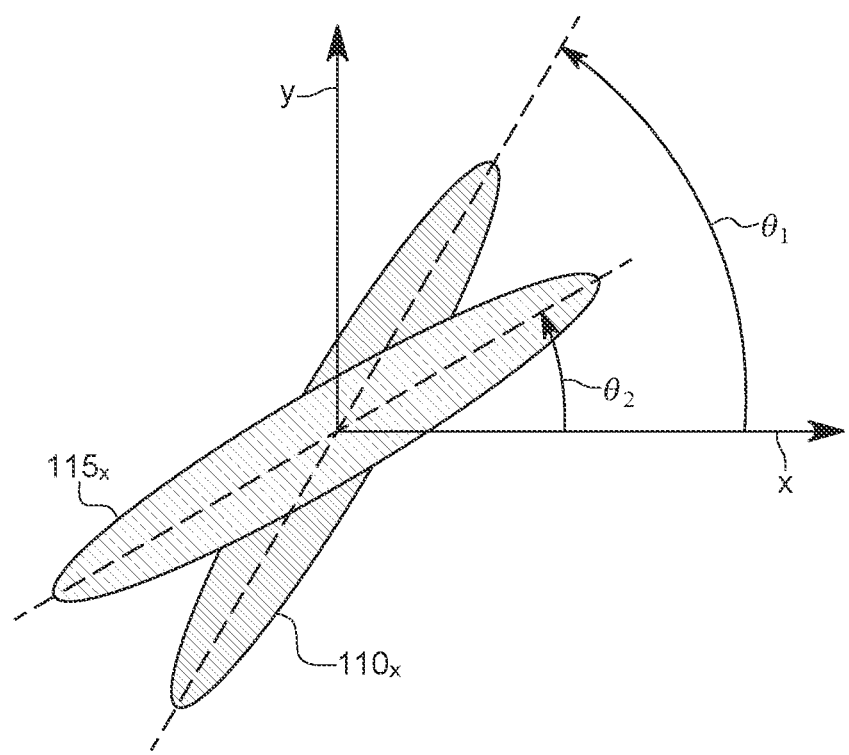
FIG. 2 is a schematic diagram of two antennas of two layers of antennas of a multilayer metalens cell according to embodiments.
Figure 3:
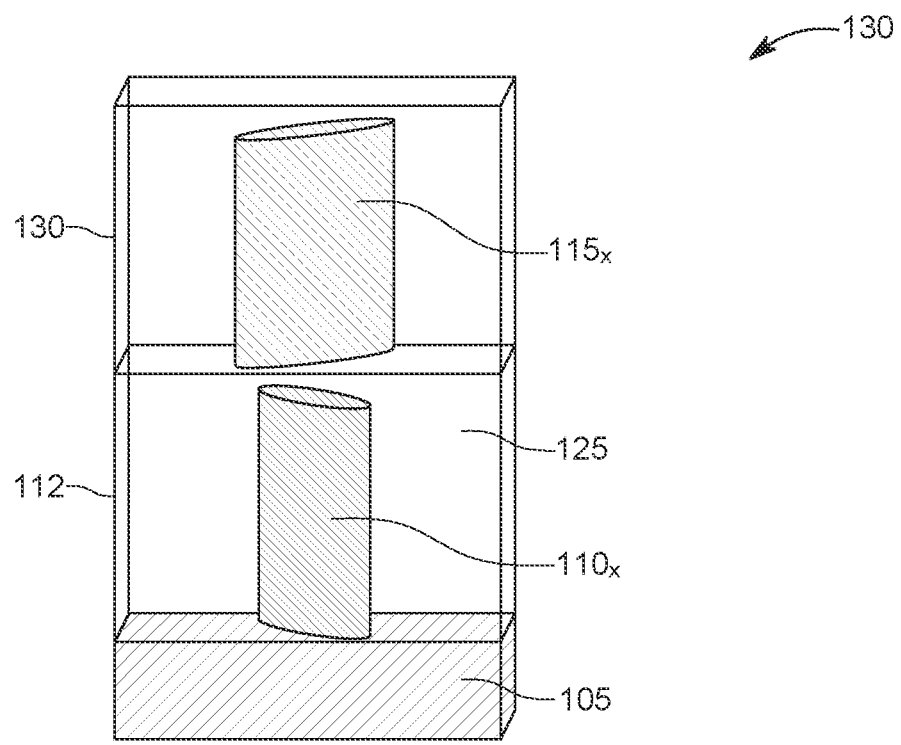
FIG. 3 is a schematic diagram of two antennas of two layers of antennas of a multilayer metalens cell according to embodiments.
Figure 4:
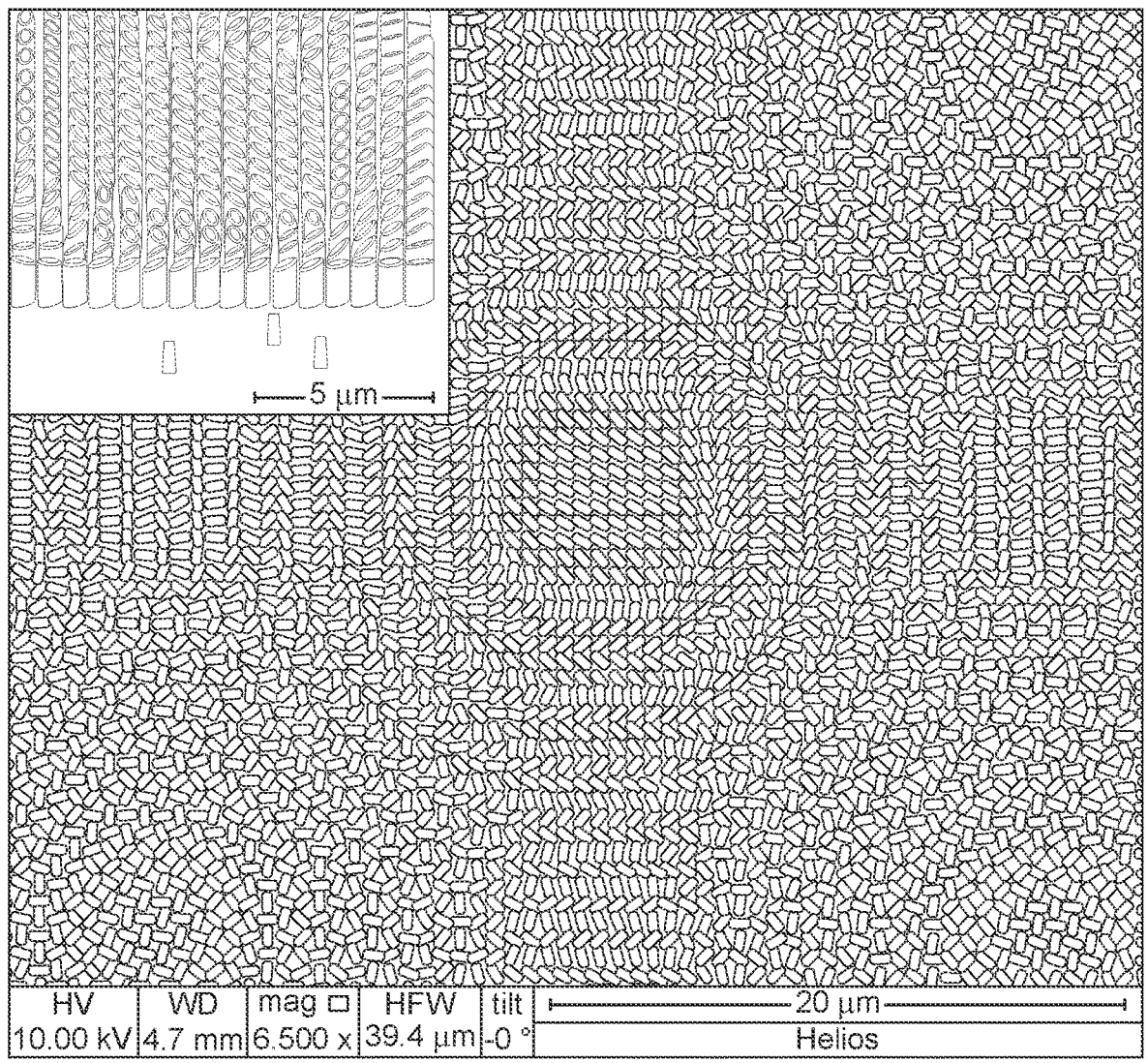
FIG. 4 is a scanning electron microscope (SEM) image of a layer of antennas with each antenna having a position-dependent rotation according to embodiments.

Turning first to FIGS. 1-3, which illustrate multilayer metalens 100 and various components of the metalens 100. The metalens 100 includes a substrate 105 having first x, second y, and third z axes that are perpendicular to each other. A first layer of antennas 110 is arranged, relative to the third axis z, on the substrate 105. Each antenna $110_x$ (only one of which is labeled for sake of clarity) of the first layer of antennas 110 is rotated relative to the first x and second y axes based on a position of each antenna $110_x$ of the first layer of antennas 110 along the first x and second y axes. A second layer of antennas 115 is arranged, in the third axis z, on the first layer of antennas 110. Each antenna $115_x$ (only one of which is labeled for sake of clarity) of the second layer of antennas 115 is rotated relative to the first x and second y axes based on a position of each antenna $115_x$ of the second layer of antennas 115 along the first x and second y axes. Each antenna $110_x$ and $115_x$ in the first 110 and second 115 layers of antennas has, in a plane parallel to a top of the substrate 105, an elongated shape. Each antenna $110_x$ in the first layer of antennas 110 has a different rotation relative to the first x and second y axes than an antenna $115_x$ in the second layer of antennas 115 that is located, relative to the third axis z, adjacent to the respective antenna $110_x$ in the first layer of antennas 110. A scanning electron microscope (SEM) image of a layer of antennas having individual antennas with a position-dependent rotation is illustrated in FIG. 4.

The antennas $110_x$ and $115_x$ of the first 110 and second 115 layers of antennas configured in the manner above each impart a Pancharatnam-Berry phase on the light passing through the metalens 100. It was discovered that a metalens with two layers of antennas configured in the manner discussed above, each of which imparts of a Pancharatnam-Berry phase on the light, produces two focal points, which are labeled F1 and F2 in FIG. 1. Because both focal points F1 and F2 are formed from substantially all of the light 120 impinging on the metalens 100, the disclosed metalens produces the two focused beams of light having significantly better light intensity (i.e., focal intensity) than the conventional spatial multiplexing technique. Further, the parameters of the metalens 100 can easily be adjusted to control the relative focal intensity of the two focal points F1 and F2. The particular details of how the metalens forms the two focal points F1 and F2 and how to adjust the relative focal intensity of the two focal points F1 and F2 will be addressed below.

Although FIGS. 1-3 illustrate the elongated shape of the antennas as being elliptical, other elongated shapes can be employed, such as rectangular shapes.

Figure 5:
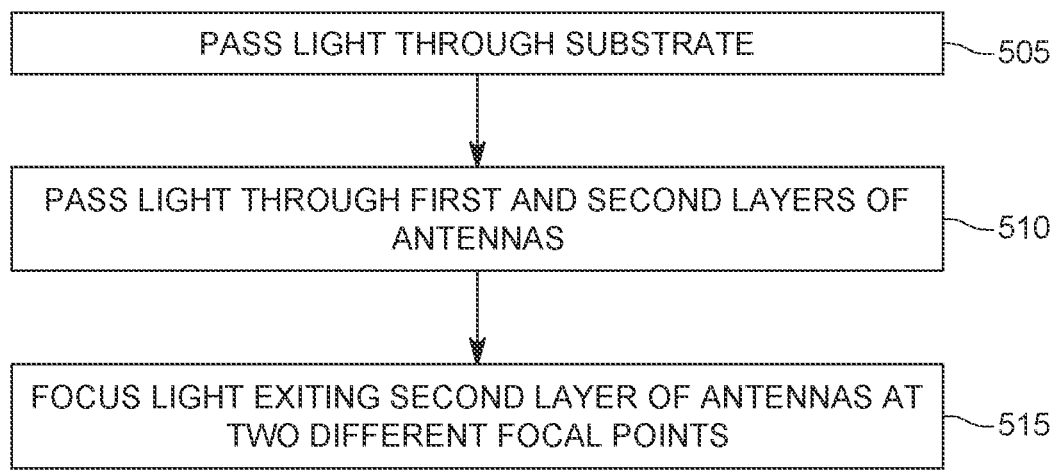
FIG. 5 is flowchart of a method for using a multilayer metalens according to embodiments.

Turning now to the flowchart of FIG. 5, which will be discussed in connection with FIGS. 1-3, a method for using the metalens 100 is presented. Initially, light 120 is passed through the substrate 105 having first x, second y, and third z axes that are perpendicular to each other (step 505). The light 405 is then passed through the first 110 and second 115 layers of antennas (step 510). The light exiting the second layer of antennas 115 is then focused at the two different focal points F1 and F2 (step 515). Each antenna $110_x$ and $115_x$ of the first 110 and second 115 layers of antennas has a position-dependent rotation angle $\theta_1$ and $\theta_2$, respectively, based on the two different focal points F1 and F2. Each antenna $110_x$ in the first layer of antennas 110 has a different rotation angle than the antenna $115_x$ in the second layer of antennas 115 that is located, relative to the third axis z, adjacent to the respective antenna $110_x$ in the first layer of antennas 110. Each antenna $110_x$ and $115_x$ of the first 110 and second 115 layers of antennas has an elongated shape in a plane defined by the first x and second y axes.

Figure 6:
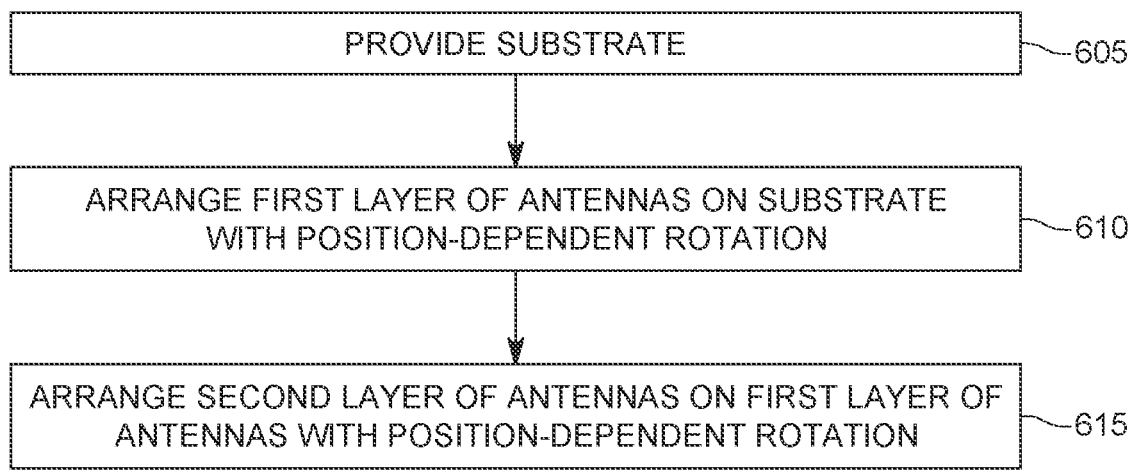
FIG. 6 is flowchart of a method for forming a multilayer metalens according to embodiments.

Turning now to the flowchart of FIG. 6, which will be discussed in connection with FIGS. 1-3, a method for forming the metalens 100 is presented. Initially, a substrate 105 having first x, second y, and third z axes that are perpendicular to each other is provided (step 605). A first layer of antennas 110 is arranged, relative to the third axis z, on the substrate 105 (step 610). Each antenna $110_x$ of the first layer of antennas 110 is rotated relative to the first x and second y axes based on a position of each antenna $110_x$ of the first layer of antennas 110 along the first x and second y axes. A second layer of antennas 115 is arranged, relative to the third axis z, on the first layer of antennas 110 (step 615). Each antenna $115_x$ of the second layer of antennas 115 is rotated relative to first x and second y axes based on a position of each antenna $115_x$ of the second layer of antennas 115 along the first x and second y axes. Each antenna $110_x$ and $115_x$ in the first 110 and second 115 layers of antennas has, in a plane parallel to a top of the substrate 105, an elongated shape. Each antenna $110_x$ in the first layer of antennas 110 has a different rotation relative to the first x and second y axes than the antenna $115_x$ in the second layer of antennas 115 that is located, relative to the third axis z, adjacent to the respective antenna $110_x$ in the first layer of antennas 110.

Referring again to FIG. 1, the antennas $110_x$ and $115_x$ can be composed of, for example, titanium dioxide ($TiO_2$), gallium nitride (GaN), aluminum gallium nitride (AlGaN), aluminum nitride (AlN), or any other transparent or partially transparent material that can be processed by etching and deposition. Further, a filler material 112 can be added to the first layer of antennas and a filler material 116 can be added to the second layer of antennas. The filler material 112 and 116 can be composed of any transparent or partially transparent dielectric material having a smaller index of refraction than the material used for the antennas. For example, the filler material 112 and 116 can be composed of silicon oxide ($SiO_2$) or silicon nitride ($Si_3N_4$). The filler material 112 and 116 can be added after the respective layer of antennas are arranged on the metalens in their position-dependent rotation. The substrate 105 can be any type of transparent substrate, for example, glass, quartz, sapphire, silicon or any other material that is suitable for use in CMOS fabrication techniques.

An example of one particular method for forming each layer of antennas will now be presented. Initially, the substrate or an existing layer of antennas is, for example, spin-coated with a photoresist. The photoresist is then patterned based on the position-dependent rotation and geometry of each antenna in the layer of antennas. The patterning can involve, for example, exposing the photoresist by electron beam lithography or UV lithography and subsequently develop the exposed photoresist in, for example, 99% o-xylene. Atomic layer deposition can then be used to deposit the material for each of the antennas in the patterned openings. The photoresist can then be removed and the filler material 116 can be formed across the particular layer to fill-in any gaps between each antenna of the layer of antennas. If necessary, chemical mechanical polishing can be performed to smooth out the surface of the layer to facilitate the fabrication of subsequent layers. It should be recognized that other methods can be employed to form the position-dependent rotated antennas.

Figure 7:
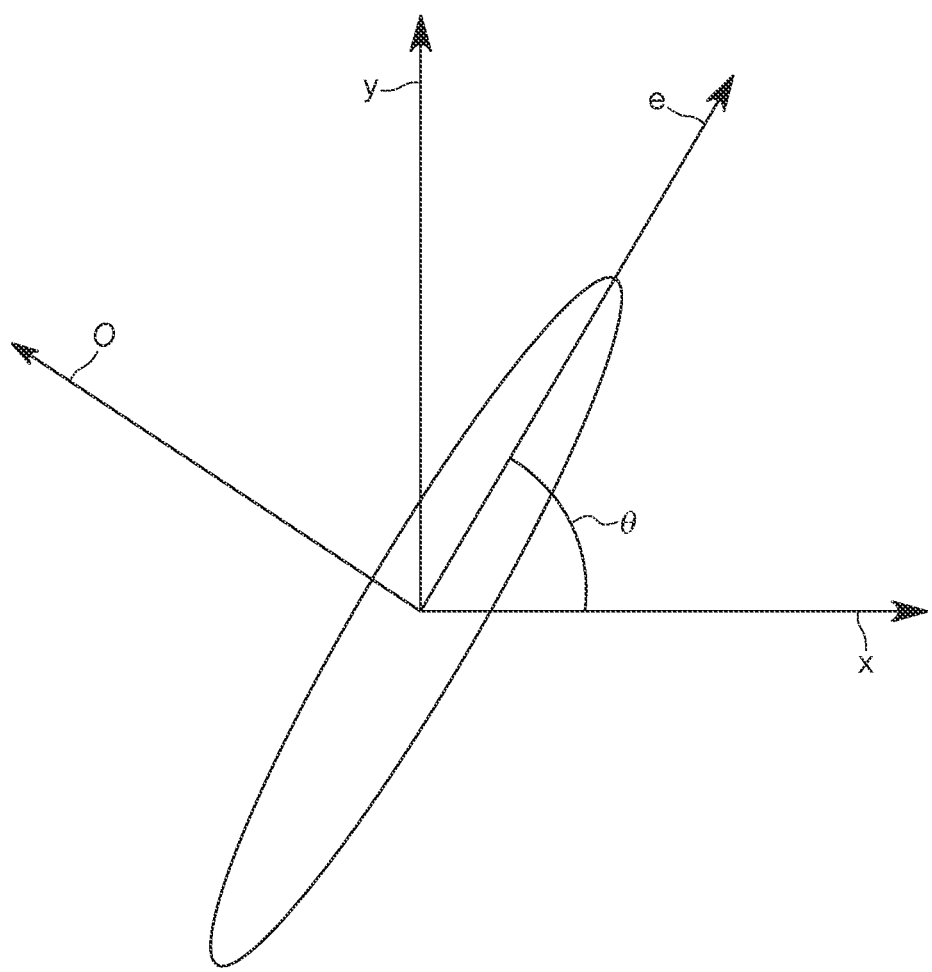
FIG. 7 illustrates the orientation of an antenna about the ordinary, extraordinary, and x and y axes according to embodiments.

Now that the structure, use, and method of forming a metalens has been described, the manner in which the metalens employs the two layers of antennas, each of which exhibits a Pancharatnam-Berry phase, to produce the two focal points will be addressed. Considering an anisotropic antenna structure with the ordinary and extraordinary axes (o and e) shown in FIG. 7, the complex transmission coefficients of linear polarization along the ordinary and extraordinary axis are denoted as $t_o$ and $t_e$ respectively. As the antenna is rotated by an angle of $\theta$ with respect to the laboratory axes (x and y), the transmission coefficients can be obtained by the following Jones matrix formalism:

$$J(\theta)_{linear} = \begin{bmatrix} t_o\cos^2\theta + t_e\sin^2\theta & (t_o - t_e)\cos\theta\sin\theta \\ (t_o - t_e)\cos\theta\sin\theta & t_o\sin^2\theta + t_e\cos^2\theta \end{bmatrix} \quad (1)$$

For simplicity and clarity, the analysis is performed in circular polarization basis and accordingly the linear basis $\hat{x}$, $\hat{y}$ is changed to the circular basis $\hat{L}$, $\hat{R}$ using the following transformation $$\left(\hat{L} = \frac{\hat{x} + i\hat{y}}{\sqrt{2}}, \hat{R} = \frac{\hat{x} - i\hat{y}}{\sqrt{2}}\right).$$

The Jones matrix in the basis of circular polarization can be written as:

$$J(\theta)_{circular} = \begin{Bmatrix} \frac{1}{2}(t_o + t_e) & \frac{1}{2}(t_o - t_e)e^{j2\theta} \\ \frac{1}{2}(t_o - t_e)e^{-j2\theta} & \frac{1}{2}(t_o + t_e) \end{Bmatrix} \quad (2)$$

Now if there are two layers of the Pancharatnam-Berry antennas (also referred to as phase elements) overlaying on each other relative to the third axis z, the combined Jones matrix can be calculated as follows assuming their rotation angles are $\theta_1$, $\theta_2$ and the complex transmission coefficients are $t_o$, $t_e$, $t'_o$, and $t'_e$ respectively:

$$J(\theta_1, \theta_2) = J(\theta_2)J(\theta_1) = \begin{bmatrix} \frac{1}{2}(t'_o + t'_e) & \frac{1}{2}(t'_o - t'_e)e^{j2\theta_2} \\ \frac{1}{2}(t'_o - t'_e)e^{-j2\theta_2} & \frac{1}{2}(t'_o + t'_e) \end{bmatrix} \quad (3)$$

$$\begin{bmatrix} \frac{1}{2}(t_o + t_e) & \frac{1}{2}(t_o - t_e)e^{j2\theta_1} \\ \frac{1}{2}(t_o - t_e)e^{-j2\theta_1} & \frac{1}{2}(t_o + t_e) \end{bmatrix}$$

For simplicity, the following notation is employed:

$$\begin{cases} t_o + t_e = T_1, & t_o - t_e = T_2 \\ t'_o + t'_e = T'_1, & t'_o - t'_e = T'_2 \end{cases} \quad (4)$$

After linear calculations, the Jones matrix of the system becomes:

$$J(\theta_1, \theta_2)_{combined} = \quad (5)$$

$$\begin{bmatrix} \frac{1}{4}T_1T'_1 + \frac{1}{4}T_2T'_2e^{j2(\theta_2-\theta_1)} & \frac{1}{4}T_2T'_1e^{j2\theta_1} + \frac{1}{4}T_1T'_2e^{j2\theta_2} \\ \frac{1}{4}T_2T'_1e^{-j2\theta_1} + \frac{1}{4}T_1T'_2e^{-j2\theta_2} & \frac{1}{4}T_1T'_1 + \frac{1}{4}T_2T'_2e^{j2(\theta_1-\theta_2)} \end{bmatrix}$$

For a circularly polarized input $$\begin{pmatrix} 1 \\ 0 \end{pmatrix}$$

passing through the system, the resultant transmitted light can be expressed as:

$$E_t = \frac{1}{4}T_1T'_1\begin{pmatrix}1\\0\end{pmatrix} + \frac{1}{4}T_2T'_2e^{j2(\theta_2-\theta_1)}\begin{pmatrix}1\\0\end{pmatrix} + \quad (6)$$

$$\frac{1}{4}T_2T'_1e^{-j2\theta_1}\begin{pmatrix}0\\1\end{pmatrix} + \frac{1}{4}T_1T'_2e^{-j2\theta_2}\begin{pmatrix}0\\1\end{pmatrix}$$

The resultant transmitted light contains four diffraction orders: the first order has the same helicity and phase as the input light; the second order has the same helicity as the incident light, but it undergoes a phase change of $2(\theta_2-\theta_1)$ and the last two orders have the opposite helicity as the incident light and experience a phase shift of $-2\theta_1$ and $-2\theta_2$ respectively. These phase changes can be employed to provide a metalens with three focusing points. However, there are only two degrees of freedom $\theta_1$ and $\theta_2$, and thus arbitrary control of three focal points is not possible. Accordingly, to provide arbitrary control of the focal points, the following analysis is directed to a bifocal metalens, and thus the $T'_1$ is set equal to zero. In this case the output beam becomes:

$$E_t = \frac{1}{4}T_2 T_2' e^{j2(\theta_2-\theta_1)}\begin{pmatrix}1\\0\end{pmatrix} + \frac{1}{4}T_1 T_2' e^{-j2\theta_2}\begin{pmatrix}0\\1\end{pmatrix} \quad (7)$$

The output beam consists of two circularly polarized components:

$$\begin{pmatrix}1\\0\end{pmatrix}$$

with $2(\theta_2-\theta_1)$ phase shift and $$\begin{pmatrix}0\\1\end{pmatrix}$$

with a phase shift of $-2\theta_2$. In order for these two diffraction orders to focus, the spatial variation of the phase shift has to meet the following condition:

$$\varphi_F(x, y) = \frac{2\pi}{\lambda}\left(F - \sqrt{x^2 + y^2 + F^2}\right) \quad (8)$$

where $\lambda$ is the design wavelength (i.e., the desired wavelength to be focused by the metalens), F is the focal length, and x and y represent the discretized spatial coordinates. The phase changes of the two diffraction orders have to meet the condition in Equation (8) simultaneously:

$$\begin{cases} 2(\theta_2 - \theta_1) = \varphi_{F1}(x, y) \\ -2\theta_2 = \varphi_{F2}(x, y) \end{cases} \quad (9)$$

Accordingly, substituting equation (8) into equation (9), the position-dependent rotation angles of the antennas $110_x$ in the first layer of antennas 110 ($\theta_1$) and of the antennas $115_x$ in the second layer of antennas 115 ($\theta_2$) can be determined as follows:

$$\theta_1 = -\frac{2\pi}{2\lambda}\left(F_1 - \sqrt{x_1^2 + y_1^2 + F_1^2}\right) - \frac{2\pi}{2\lambda}\left(F_2 - \sqrt{x_2^2 + y_2^2 + F_2^2}\right) \quad (10)$$

$$\theta_2 = -\frac{2\pi}{2\lambda}\left(F_2 - \sqrt{x_2^2 + y_2^2 + F_2^2}\right) \quad (11)$$

A circularly polarized light is supplied to the metalens, which splits it into $$\begin{pmatrix}1\\0\end{pmatrix} \text{ and } RCP\begin{pmatrix}0\\1\end{pmatrix}$$

components, which are focused at different focal spots F1 and F2 as illustrated in FIG. 1. Linearly polarized light can also be employed to achieve to different focal spots F1 and F2, however, the focusing efficiency will be lower compared to circularly polarized light.

Figure 8:
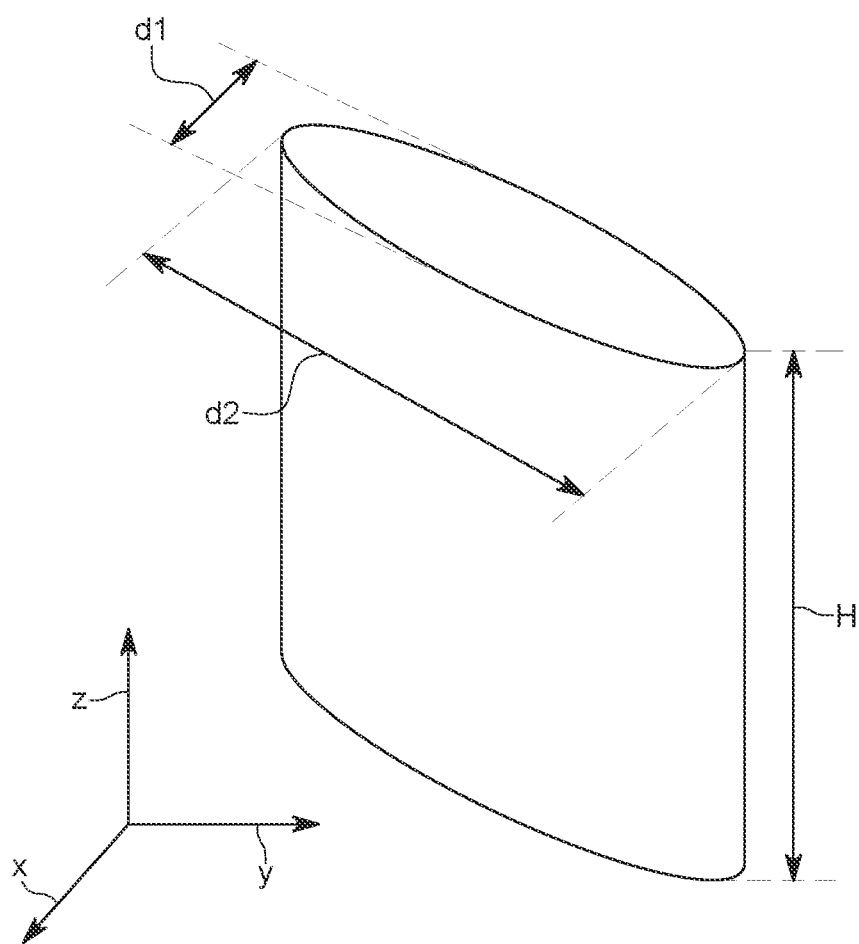
FIG. 8 is a schematic diagram illustrating the geometry of an antenna according to embodiments.

In order to meet the condition $T'_1=0$, the geometrical parameters of the second antenna layer 115 have to be optimized so that $|t_o|=|t_e|$ and angle $(t_o)$-angle $(t_e)=\pi$. The optimization involved a parameter sweep for the geometries of the elongated antennas $115_x$ of the second antenna layer 115 using the commercial three-dimensional (3D) Finite-Difference Time-Domain (FDTD) solver (FDTD solutions, Lumerical Inc). Referring now to FIG. 8, the periodicity, length d2 and height of the elongated antennas $115_x$ of the second antenna layer 115 were set to be 300, 200 and 600 nm respectively, while the width d1 of the elongated antennas $115_x$ of the second antenna layer 115 was varied to obtain the optimal value. A wavelength of 480 nm, which lies in the visible spectrum, was employed as the desired wavelength to be focused by the metalens.

Referring again to FIG. 7, to follow the conventions, transverse electric (TE) is used to represent the polarization state along the ordinary axis o while the transverse magnetic (TM) represents the polarization state along the extraordinary axis e. The phase difference of transverse electric (TE) and transverse magnetic (TM) polarizations when the elongated antennas $115_x$ of the second antenna layer 115 were configured with d1=94 nm. For TE polarization, the phase of the transmitted field decreased in a smooth manner as the wavelength increased. In contrast, the phase of TM polarization exhibited three jumps in the spectrum at ~410, ~460, and ~505 nm, which corresponds to three TM resonance of the structure, as was verified from the transmission curve where a sudden drop of transmission was observed. These jumps can increase the phase difference (TM-TE) and therefore a phase difference of $\pi$ at the desired wavelength to be focused by the metalens of 480 nm. The transmission of TM and TE polarization at the wavelength of 480 nm were 0.86 and 0.89 respectively. Although in a practical application it is difficult to obtain a geometry with identical TM and TE transmission while meeting the phase condition at the same time, the transmission values were close enough to provide satisfactory results. The phase profile for both TE and TM polarization at 480 nm with the optimized geometrical properties was determined. The phase difference for TM and TE polarization is exactly half a wavelength, which not only reduces the transmission into two terms as shown in Equation (7) but also ensures a 100% polarization conversion efficiency of the second layer of antennas 115. It should be noted that nanofabrication errors are inevitable and can result in suboptimal geometries with deteriorated efficiency and a third focal point at a distance corresponding to the phase shift of $-2\theta_1$. However, a sweep of optimized d1 and d2 within ±20 nm of the optimized value revealed that the focal intensity of the third focal spot is much less than those of the main peaks.

Based on the optimized geometrical parameters and the rotation angles from Equations (10) and (11), a 3D FDTD simulation model was built with an aperture size of 13 μm×13 μm. The size of the whole simulation region was 14 μm×14 μm×22 μm with a mesh size of 10 nm×10 nm×20 nm in the metalens region and 40 nm×40 nm×40 nm in the free space. The geometries of the first layer of antennas were made the same as the second layer of antennas except the height H is of the antennas of the first layer of antennas was reduced to 400 nm to reduce the difficulty filling material deposition process.

Three bifocal metalenses with different focal lengths were simulated and their electric field intensity profiles at the xz plane were obtained. The antennas were composed of titanium dioxide ($TiO_2$) and the filler material was composed of silicon dioxide ($SiO_2$), which exhibit a refractive index at the desired wavelength to be focused by the metalens of 2.49 and 1.46, respectively In these designs, F1 was fixed at 8 µm while F2 was gradually increased. Clear focusing effects were observed with minimal crosstalk between the focal spots. The intensity of the electric field at the focal length along the x direction was plotted, where the full-width at half-maximum's (FWHMs) of all the focal spots were close to the theoretical diffraction limited value of $$\frac{\lambda}{2NA},$$

with NA being the numerical aperture. The focusing properties are summarized in detail in the table below.

|  |  | Designed value (µm) | Simulated value (µm) | FWHM (nm) | NA |
|---|---|---|---|---|---|
| Design 1 | F1 | 8 | 7.6 | 396 | 0.65 |
|  | F2 |  |  |  |  |
| Design 2 | F1 | 8 | 7.6 | 394 | 0.65 |
|  | F2 | 12 | 11.5 | 512 | 0.5 |
| Design 3 | F1 | 8 | 7.6 | 394 | 0.65 |
|  | F2 | 14 | 13.3 | 570 | 0.44 |

The simulated focal lengths are in good agreement with the designed values, despite some minor errors. As a non-limiting example, the focusing performance of Design 2 will now be discussed. With a lateral length of 13 µm, the corresponding numerical apertures of these two focal points are 0.65 and 0.5, which provides diffraction-limited FWHMs of 369 and 488 nm, respectively. The FWHMs obtained from numerical simulations were 394 and 512 nm, which is close to the theoretical diffraction limit. Due to the computational restrictions, it was not possible to calculate a larger lens, so the NA of F1 is much larger than that of F2. This explains why the focusing property of F1 is better than F2. In reality, this problem can be addressed by manufacturing a larger lens so that the NA of both focal points are similar.

One advantage of the disclosed multilayer metalens is its robust and straightforward design protocol. In the multifocal schemes that rely on the combination of the propagation phase and the Pancharatnam-Berry phase, both the propagation phase and the TM–TE phase difference are controlled by the same set of geometrical parameters. A large number of sweeping and optimization are required to generate a library. In contrast, the design process is greatly simplified in the disclosed multilayer metalens because identical elements can be used and only one parameter sweeping is required to achieve the optimized geometry.

Another important factor to consider when designing multifocal lenses is the focal intensity ratios at the focal points. The intensity ratio of the two focal spots Equation (7):

$$\frac{J_{F1}}{J_{F2}} = \frac{|T_2 T_2'|^2}{|T_1 T_2'|^2} = \frac{|T_2|^2}{|T_1|^2} = \frac{|t_o - t_e|^2}{|t_o + t_e|^2} \qquad (12)$$

As will be appreciated from this equation, the relative focal intensity at focal lengths F1 and F2 is controlled solely by the $t_o$ and the $t_e$ of the first layer of antennas. This property decouples focal spot position and relative focal intensity so arbitrary combinations of focal lengths and intensity ratios can be achieved. The electric field intensity profile of different ratios when the focal lengths are fixed was generated. The different ratios were realized by adjusting the d1 of the antennas of the first layer of antennas while fixing the rotational angles θ and all other geometrical parameters. Here, $$\frac{I_{F1}}{I_{F2}}$$

was calculated to be 2.5:1, 0.9:1, and 1:3 for three designs.

Figure 9:
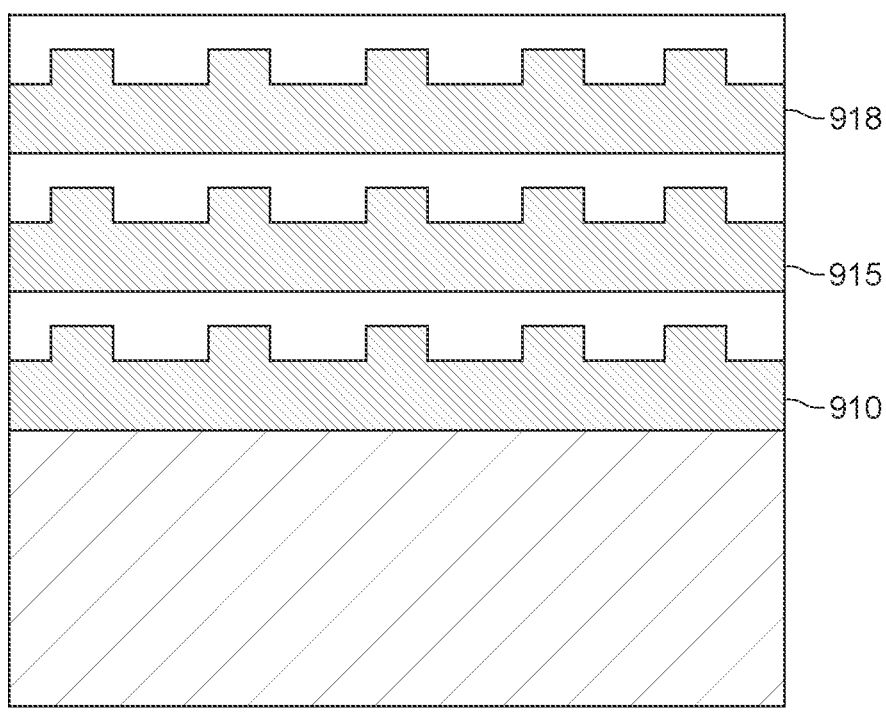
FIG. 9 is a schematic diagram of a three-layer metalens according to embodiments.

Other ratios can also be obtained by changing the geometries of the antennas of the first layer of antennas. As discussed above, a typical spatial multiplex scheme for multifocal metalenses is to divide the surface area into several concentric rings, each ring corresponding to one focal spot. Because in this design only a portion of the aperture is involved in the formation of each focal spot, the focusing efficiency and numerical aperture (NA) corresponding to each ring can be quite different, which makes the relative focal intensity more difficult to control. Compared to those methods, configuring the antennas in the first and second layers of antennas as disclosed, the relative focal intensity depends only on the transmission of the first layer of antennas. Moreover, in the disclosed multilayer metalens, the whole surface is involved in the formation of each of the two focal spots and the NA varies in a controllable manner. This provides a straightforward and robust way of designing multifocal lenses. Furthermore, the number of layers can be increased by taking advantage of nanofabrication technology, providing more parameters to achieve more complicated functionalities, such as multifocal lenses and achromatic lenses. For example, as illustrated in FIG. 9, the multilayer metalens can include three layers of antennas 910, 915, and 918, each layer producing an independently controllable focal point. It should be recognized that additional layers can be employed, as desired. Each additional layer can produce its own independently controllable focal point.

As discussed above, the disclosed multilayer metalens produces an output beam having four orders of polarization: one maintains the input helicity and phase; another one maintains the input helicity but assumes a phase change of $2(\theta_2-\theta_1)$; the last two orders of diffraction have the opposite helicity and experience a phase shift of $-2\theta_1$ and $-2\theta_2$ respectively. Accordingly, in one embodiment, a bifocal metalens is provided with separate control of focal position and relative focal intensity that has not yet been realized in reported bifocal metalenses. It is a straightforward and robust way to achieve bifocal metalens. Such architecture can be extended to multilayer and be employed to achieve more complicated functionalities.

The disclosed embodiments provide a multilayer metalens and method of production. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multilayer metalens, comprising: a substrate having first (x), second (y), and third (z) axes that are perpendicular to each other; a first layer of antennas arranged, relative to the third axis (z), on the substrate, wherein a longitudinal first axis of each antenna of the first layer of antennas is rotated relative to the first (x) and second (y) axes based on a position of each antenna of the first layer of antennas along the first (x) and second (y) axes; and a second layer of antennas arranged, in the third axis (z), on the first layer of antennas, wherein a longitudinal second axis of each antenna of the second layer of antennas is rotated relative to the first (x) and second (y) axes based on a position of each antenna of the second layer of antennas along the first (x) and second (y) axes, wherein each antenna in the first and second layers of antennas has, in a plane parallel to a top of the substrate, an elongated shape, and wherein the longitudinal first axis of each antenna in the first layer of antennas has a different rotation relative to the first (x) and second (y) axes than the longitudinal second axis of an antenna in the second layer of antennas that is located, relative to the third axis (z), adjacent to the respective antenna in the first layer of antennas.

2. The multilayer metalens of claim 1, wherein the elongated shape of each antenna in the first and second layers of antennas is elliptical or rectangular.

3. The multilayer metalens of claim 1, wherein a first rotation angle of the longitudinal first axis of each antenna in the first layer of antennas depends on (1) a wavelength of light to be focused by the multilayer metalens, (2) first and second focal lengths of the multilayer metalens, and (3) a position of the antenna in the first layer of antennas relative to the first and second axes, and a second rotation angle of the longitudinal second axis of each antenna in the second layer of antennas depends on (1) the wavelength of the light, (2) the first and second focal lengths, and (3) a position of the antenna in the second layer of antennas relative to the first and second axes.

4. The multilayer metalens of claim 1, wherein the elongated shape of each antenna in the second layer of antennas is configured so that an absolute value of complex transmission coefficients for linear polarization along an ordinary axis and an absolute value of complex transmission coefficients for linear polarization along an extraordinary axis are equal; and a phase difference of the complex transmission coefficients for linear polarization along the ordinary axis and the absolute value of complex transmission coefficients for linear polarization along the extraordinary axis are equal to Pi (π).

5. The multilayer metalens of claim 1, wherein the multilayer metalens produces two focal points.

6. The multilayer metalens of claim 5, wherein an intensity and position of the two focal points are independently controllable with no crosstalk.

7. The multilayer metalens of claim 1, further comprising: a third layer of antennas arranged, relative to the third axis, on the second layer of antennas, wherein a longitudinal third axis of each antenna of the third layer of antennas is rotated relative to first and second axes based on a position of each antenna along the first and second axes, wherein each antenna in the third layer of antennas has, in the plane parallel to a top of the substrate, an elongated shape, and wherein the longitudinal third axis of each antenna in the third layer of antennas has a different rotation relative to the first and second axes than the longitudinal second axis of an antenna in the second layer of antennas and the longitudinal first axis of an antenna in the first layer of antenna that is located, relative to the third axis, below the respective antenna in the third layer of antennas.

8. The multilayer metalens of claim 1, wherein each antenna of the first and second layers of antennas comprise titanium dioxide.

9. The multilayer metalens of claim 8, wherein the first and second layers of antennas are encased in a transparent material.

10. The multilayer metalens of claim 9, wherein the transparent material is silicon dioxide.

11. The multilayer metalens of claim 1, wherein the rotation of each antenna of the first and second layers of antennas is defined by $$\theta_1 = -\frac{2\pi}{2\lambda}\left(F_1 - \sqrt{x_1^2 + y_1^2 + F_1^2}\right) - \frac{2\pi}{2\lambda}\left(F_2 - \sqrt{x_2^2 + y_2^2 + F_2^2}\right)$$

$$\theta_2 = -\frac{2\pi}{2\lambda}\left(F_2 - \sqrt{x_2^2 + y_2^2 + F_2^2}\right)$$

wherein θ1 and θ2 are the rotation angles of the first and second layers of antennas, respectively, λ is a wavelength of light to be focused by the multilayer metalens, $F_1$ and $F_2$ are the first and second focal lengths, respectively, $x_1$ and $y_1$ are a position of an antenna in the first layer of antennas relative to the first and second axes, and are $x_2$ and $y_2$ are a position of an antenna in the second layer of antennas relative to the first and second axes.

12. A method for forming a multilayer metalens, the method comprising: providing a substrate having first (x), second (y), and third (z) axes that are perpendicular to each other; arranging, relative to the third axis (z), a first layer of antennas on the substrate, wherein a longitudinal first axis of each antenna of the first layer of antennas is rotated relative to the first (x) and second (y) axes based on a position of each antenna of the first layer of antennas along the first (x) and second (y) axes; and arranging, relative to the third axis (z), a second layer of antennas on the first layer of antennas, wherein a longitudinal second axis of each antenna of the second layer of antennas is rotated relative to first (x) and second (y) axes based on a position of each antenna of the second layer of antennas along the first (x) and second (y) axes, wherein each antenna in the first and second layers of antennas has, in a plane parallel to a top of the substrate, an elongated shape, and wherein the longitudinal first axis of each antenna in the first layer of antennas has a different rotation relative to the first (x) and second (y) axes than the longitudinal second axis of an antenna in the second layer of antennas that is located, relative to the third axis (z), adjacent to the respective antenna in the first layer of antennas.

13. The method of claim 12, further comprising: arranging, relative to the third axis, a third layer of antennas on the second layer of antennas, wherein a longitudinal third axis of each antenna of the third layer of antennas is rotated relative to first and second axes based on a position of each antenna in the third layer, wherein each antenna in the third layer of antennas has, in the plane parallel to a top of the substrate, an elongated shape, and wherein the longitudinal third axis of each antenna in the third layer of antennas has a different rotation relative to the first and second axes than the longitudinal second axis of an antenna in the second layer of antennas and the longitudinal first axis of an antenna in the first layer of antenna that is located, relative to the third axis, below the respective antenna in the third layer of antennas.

14. The method of claim 12, wherein the arranging of the first layer of antennas comprises arranging each of the antennas in the first layer of antennas so that adjacent antennas in the first layer of antennas are spaced apart from each other by a distance that is smaller than a wavelength of incident light to be focused by the multilayer metalens; and the arranging of the second layer of antennas comprises arranging each of the antennas in the second layer of antennas so that adjacent antennas in the second layer of antennas are spaced apart from each other by a distance that is smaller than a wavelength of incident light to be focused by the multilayer metalens.

15. The method of claim 12, further comprising: forming each of the antennas of the first and second layers of antennas so that the elongated shape in the first and second layers, respectively, is elliptical.

16. The method of claim 12, further comprising: forming each antenna of the first and second layers of antennas so that the elongated shape in the first and second layers, respectively, is rectangular.

17. The method of claim 12, further comprising: selecting first and second focal lengths of the metalens; and determining a position-dependent rotation angle of each antenna in the first and second layers of antennas based on the selected first and second focal lengths, wherein each antenna of the first and second layers of antennas is rotated relative to the first and second axes based on the determined position-dependent rotation angle.

18. The method of claim 17, wherein the position-dependent rotation angle of each antenna of the first and second layers of antennas is determined by $$\theta_1 = -\frac{2\pi}{2\lambda}\left(F_1 - \sqrt{x_1^2 + y_1^2 + F_1^2}\right) - \frac{2\pi}{2\lambda}\left(F_2 - \sqrt{x_2^2 + y_2^2 + F_2^2}\right)$$

-continued $$\theta_2 = -\frac{2\pi}{2\lambda}\left(F_2 - \sqrt{x_2^2 + y_2^2 + F_2^2}\right)$$

wherein θ1 and θ2 are the rotation angles of the first and second layers of antennas, respectively, A. is a wavelength of light to be focused by the multilayer metalens, $F_1$ and $F_2$ are the first and second focal lengths, respectively, $x_1$ and $y_1$ are a position of an antenna in the first layer of antennas, and are $x_2$ and $y_2$ are a position of an antenna in the second layer of antennas.

19. A method of focusing light at two different focal points, the method comprising: passing light through a substrate having first (x), second (y), and third (z) axes that are perpendicular to each other; passing the light through first and second layers of antennas; and focusing the light exiting the second layer of antennas at the two different focal points ($F_1$, $F_2$), wherein each antenna of the first and second layers of antennas has a position-dependent rotation angle (θ1, θ2) based on the two different focal points (F1, F2), each antenna in the first layer of antennas has a different rotation angle than an antenna in the second layer of antennas that is located, relative to the third axis (z), adjacent to the respective antenna in the first layer of antennas, and each antenna of the first and second layers of antennas has an elongated shape in a plane defined by the first (x) and second (y) axes.

20. The method of claim 19, wherein the position-dependent rotation angle of each antenna of the first and second layers of antennas is determined by $$\theta_1 = -\frac{2\pi}{2\lambda}\left(F_1 - \sqrt{x_1^2 + y_1^2 + F_1^2}\right) - \frac{2\pi}{2\lambda}\left(F_2 - \sqrt{x_2^2 + y_2^2 + F_2^2}\right)$$

$$\theta_2 = -\frac{2\pi}{2\lambda}\left(F_2 - \sqrt{x_2^2 + y_2^2 + F_2^2}\right)$$

wherein θ1 and θ2 are the rotation angles of the first and second layers of antennas, respectively, A. is a wavelength of light to be focused by the multilayer metalens, $F_1$ and $F_2$ are the first and second focal lengths, respectively, $x_1$ and $y_1$ are a position of an antenna in the first layer of antennas, and are $x_2$ and $y_2$ are a position of an antenna in the second layer of antennas.

* * * * *